June 6, 1939.  J. O. BLACKMON  2,161,501
COUPLING
Filed June 29, 1937
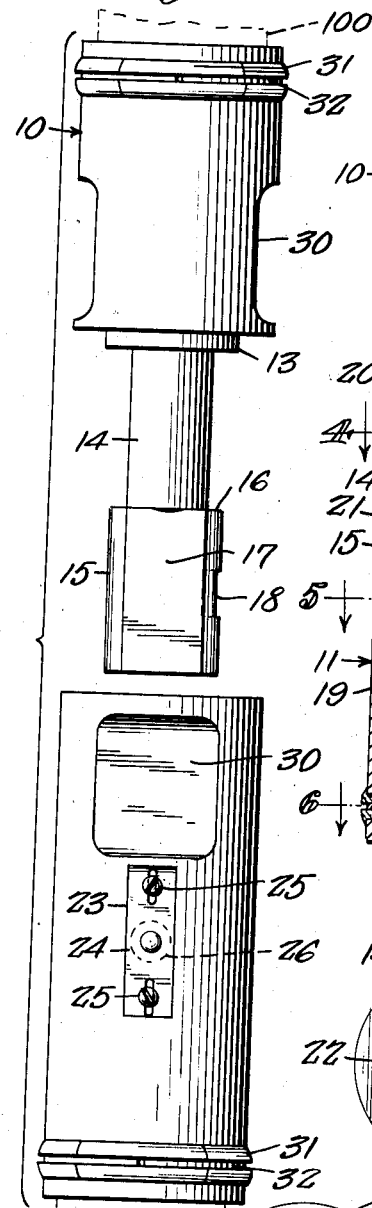
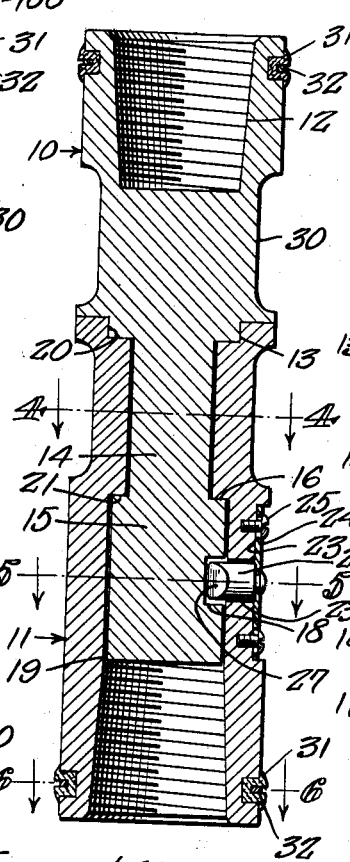
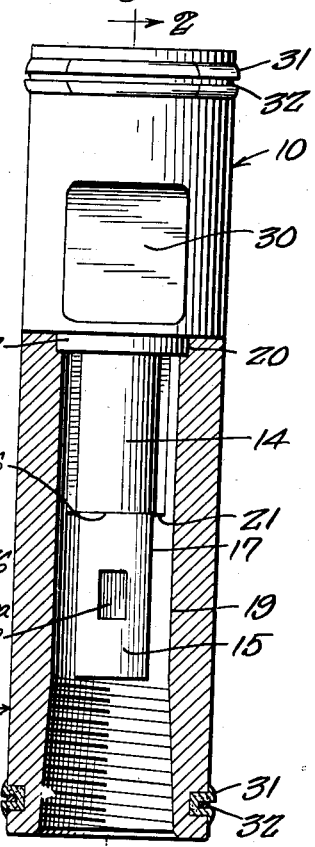
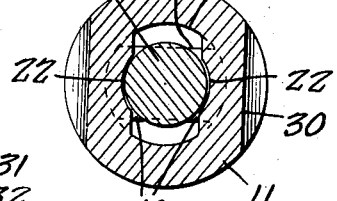
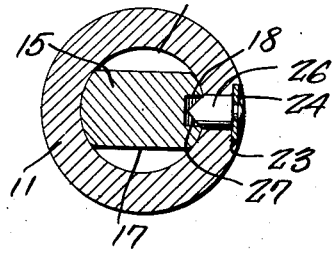
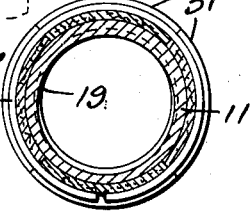
John O. Blackmon, INVENTOR
WITNESS
BY Victor J. Evans & Co.
ATTORNEYS Patented June 6, 1939

2,161,501

UNITED STATES PATENT OFFICE 2,161,501

COUPLING

John O. Blackmon, Oilfields, Calif.

Application June 29, 1937, Serial No. 151,004

1 Claim. (Cl. 287—103)

This invention relates to coupling devices and particularly to couplings for connecting rods and the like exposed to longitudinal stresses but not exposed to torsional stresses of appreciable magnitude. The invention is particularly useful in inaccessible locations such as devices for connecting the lower ends of strings of sucker rods to pump-plungers in wells.

One of the principal objects of my invention is to provide a sectional coupling having means that can be readily actuated for connecting or disconnecting the coupling sections.

Another object of my invention is to provide means whereby the wear between the coupling and tube is reduced to a minimum.

Other objects and advantages will be apparent from the following descriptions, appended claim and annexed drawing.

Referring to the drawing wherein like reference characters designate like parts throughout the several views:

Fig. 1 is a side elevation of my coupling device, the coupling sections being illustrated in disassembled position.

Fig. 2 is a longitudinal section taken on a line 2—2 of Fig. 1, the coupling sections being shown in assembled position.

Fig. 3 is a view illustrating one of the coupling sections in section and the other in elevation.

Fig. 4 is a sectional view taken on a line 4—4 of Fig. 2.

Fig. 5 is a sectional view taken on a line 5—5 of Fig. 2.

Fig. 6 is a sectional view taken on a line 6—6 of Fig. 2.

A coupling, in accordance with the invention, adapted for connecting the sucker rods together or sucker rods to a pump-plunger, consists of male and female sections 10 and 11 respectively.

The male section comprises a cylindrical elongated body formed with a threaded tapered bore 12 at one end for securing therein the threaded end of a sucker rod 100 or the like. The opposite end of said body is formed with a collar 13, of a reduced diameter, having a shank 14, said shank terminating in a head 15. The head is fashioned with oppositely disposed transversely extending segment-shaped shoulders 16 formed therebetween with plane surfaces 17. One of the shoulders is provided, intermediate of the ends thereof, with a rectangular-shaped recess 18 for a purpose hereinafter described.

The female section 11 comprises a companionable body having a longitudinally extending bore 19 tapered and threaded at one end for securing therein the threaded end of a rod 101, similar to rod 100 secured to said male section. The opposite end of the bore is enlarged to form a counter-bore 20 adapted to seat therein the collar 13 formed on the male section 10. Adjacent said counter-bore 20, the bore 19 is fashioned with spaced transversely extending segment-shaped shoulders 21 for permitting therebetween the insertion of the head 15. The oppositely disposed faces of said shoulders having formed therein longitudinally extending arcuate grooves 22, adapted to seat therein shank 14 carried by the male member. The outer periphery of the body is provided, intermediate of the end thereof, with an elongated slot 23 having a centrally disposed opening 23a registering with the recess 18 formed in the shoulder 16. A flexible plate 24 is secured within said slot by suitable screws 25 coacting with elongated apertures in said plate to permit flexing movement of said plate. The plate is provided with an inwardly extending latch bolt 26 for engagement with the walls of the recess 18 and opening 23a to prevent accidental rotation of the sections relative to each other. However, due to the flexibility of the plate 24, the sections may purposely be rotated in relation to each other, the cam faces 27 of the bolt coacting with the walls of the recess 18 to flex the plate and thus disengage said bolt from the head 15.

Both of the sections are provided with tool engaging faces 30 for manipulation, and each of said sections are further provided, at the threaded ends thereof, with sectional friction rings 31 secured in circumferential grooves by means of retaining members 32. Said rings are preferably constructed of a fiber material and serve to space the coupling from a tube or like adjacent wall, thus minimizing wear on the tube and preventing the same on the coupling.

In use, a sucker rod or the like being secured to each of said sections, the head of the male section is inserted between the shoulders 21 formed in the bore 19. Upon the collar 13 being seated within the counter-bore 20, one of the sections is rotated relative to the other for a 90° cant, permitting the bolt, which has been cammed outwardly during the rotation, to seat within the recess 18, thus securing the sections together in locked condition. Termination of the cant has positioned the shoulders 16 under and in abutting engagement with the shoulders 21 to prevent longitudinal disengagement of the sections while in the locked condition.

Obviously, my invention as herein described and illustrated, while lending itself to quick and economical operation also supplies a strong and efficient coupling adaptable for many types of work other than the character herein described.

It is to be understood that various changes and modifications may be resorted to without departing from the spirit of the invention or scope of the appended claim.

Having described my invention, what I claim is:

A coupling structure, comprising male and female sections, said male section having a head, said female section having a bore for the reception of said head and provided with head engaging shoulders coacting with said head in one position to prevent relative longitudinal movement therebetween and in another position to permit withdrawal of said head, and a latch for locking said head and comprising a normally appressed diaphragmatic plate having ends slidably anchored to said female section and having a bolt normally engaging said head to prevent accidental rotation thereof relative to said female section, said bolt movable upon positive rotation of said head to belly said plate in a manner whereby said bolt is disengaged from said head to permit said head to be withdrawn from said bore.

JOHN O. BLACKMON.